US006438639B1

(12) United States Patent
Bakke et al.

(10) Patent No.: US 6,438,639 B1
(45) Date of Patent: Aug. 20, 2002

(54) COMPUTER SYSTEM BUS NETWORK PROVIDING CONCURRENT COMMUNICATION AND CONNECTION TRANSITION OF PERIPHERAL DEVICES

(75) Inventors: Brian E. Bakke; Ronald L. Billau, both of Rochester; Lee D. Cleveland, West Concord; William S. Gartmann, Rochester, all of MN (US)

(73) Assignee: International Business Machines Corporation, Armonk, NY (US)

(*) Notice: Subject to any disclaimer, the term of this patent is extended or adjusted under 35 U.S.C. 154(b) by 760 days.

(21) Appl. No.: 08/703,496

(22) Filed: Aug. 27, 1996

(51) Int. Cl.[7] ............................................. G06F 13/38
(52) U.S. Cl. ...................... 710/302; 710/301; 710/300; 710/305; 710/313
(58) Field of Search ................................. 395/750, 281, 395/282, 283, 182.06, 182.12, 309, 371, 728; 710/300–302, 305, 313

(56) References Cited

U.S. PATENT DOCUMENTS

| 4,835,737 A | * | 5/1989 | Herrig et al. ............... 395/283 |
| 5,118,970 A | | 6/1992 | Olson et al. |
| 5,210,855 A | | 5/1993 | Bartol |
| 5,471,099 A | | 11/1995 | Larabell et al. |
| 5,530,302 A | * | 6/1996 | Hamre et al. ............... 395/282 |
| 5,564,024 A | * | 10/1996 | Pemberton ................... 395/283 |
| 5,579,491 A | * | 11/1996 | Jeffries et al. ............... 395/283 |
| 5,586,271 A | * | 12/1996 | Parret ......................... 395/283 |
| 5,596,757 A | * | 1/1997 | Smith .......................... 395/750 |
| 5,613,074 A | * | 3/1997 | Galloway .................... 395/280 |
| 5,680,288 A | * | 10/1997 | Carey et al. ................. 361/118 |

FOREIGN PATENT DOCUMENTS

JP        07-122039         5/1995

OTHER PUBLICATIONS

E.D. Baker, J.M. Dinwiddie, J.M. Joyce and G.A. Suarez, "Fault–Tolerant Battery Back–Up Power System for Controlling I/O Devices for Continuous On–Line Transactions", IBM Technical Disclosure Bulletin, vol. 32, No. 5B, Oct. 1989, pp. 15–18.

* cited by examiner

Primary Examiner—Peter Wong
Assistant Examiner—Raymond N Phan
(74) Attorney, Agent, or Firm—Bracewell & Patterson LLP

(57) ABSTRACT

A method and apparatus that prevents data corruption and power supply failure caused by device connection transition on an active SCSI bus is provided. A bus initiator pauses communication on the SCSI bus such that only communication by the bus initiator is allowed over the data communication bus. All other communication between peripheral devices attached to the data communication bus is paused. A shutdown signal from the bus initiator is transmitted over the data communication bus to a power controller, which eliminates power to a device slot corresponding to the received shutdown signal. After a connection transition of an electrical device in the device slot, a power reset signal is transmitted from the bus initiator over the data communication bus to the power controller, which then restores power to the device slot upon receiving the reset power signal. The bus initiator then releases the data communication bus from being paused such that all communication on the data communication bus by peripheral devices is allowed.

20 Claims, 2 Drawing Sheets

COMPUTER SYSTEM BUS NETWORK PROVIDING CONCURRENT COMMUNICATION AND CONNECTION TRANSITION OF PERIPHERAL DEVICES

BACKGROUND OF THE INVENTION

1. Technical Field

The present invention relates in general to computer buses, and in particular to a method and apparatus for concurrent connection transition of a peripheral device to a computer bus to establish both power and 2-way data transfer without interrupting power to other devices on the computer bus or causing data corruption on the computer bus.

2. Description of the Related Art

Various methods and apparatus for the inserting or removing peripheral devices or control circuits to computer buses are known in the art. In an effort to minimize the impact of plugging into a bus, the normal procedure has been to shut down the bus so that new devices would not disrupt data flow on the bus. An alternative has been the hot-plugging concept where both power and data transfer interconnection are achieved by directly plugging the device into power and bus connectors that are both powered and active. Hot-plugging is found in fault tolerant systems which normally include device or field replaceable unit redundancy couple operational comparison and checking logic to ensure correct operation. When a fault is detected, an indication of the failing device is provided to service personnel. The failing device is then simply removed from the bus and a replacement device connected. The removal of the failing device and the replacement of a new device are performed without regard to ongoing bus activity. Both the bus architecture and the control device electronics must be carefully designed to achieve this "hot plugging" capability.

The normal control circuits contain electronic microchips mounted on printed circuit (p.c.) boards, and circuit interconnections to the bus and for power and data transfer are made via edge connections. Edge connectors are mounted on a p.c. board which is plugged into a corresponding receptacle for connection to the bus. Plugging in the board makes electrical contact between the edge connectors and the corresponding bus receptacle and thus provides both power to the electronic components on the p.c. board and interconnects it with the bus in one operation. For hot plugging, the normal method of interconnection is to increase the length of at least the ground contact on the edge connector, so that a ground contact can be completed prior to the electrical connection of the other contacts for the application of power and the transfer of data signals. Without strict control of data design parameters of the bus architecture and control circuits, hot plugging such circuits into a computer bus likely will cause disruption in the two-way transfer of information on the bus.

This data disruption on the bus is often seen in networks using the standardized Small Computer System Interface (SCSI) bus. This standard defines the mechanical, electrical, and functional requirements for a small computer input/output bus and command protocols to enable attaching small computers with each other and with intelligent peripheral devices such as rigid or flexible disks, magnetic tape drives, printers, optical disks and other direct access storage devices (DASD), etc. Such devices will hereafter be referred to as either peripheral devices or more generally as electrical devices. The primary objective of the standard is to provide host computers with device independence within a class of electrical devices to enable a variety of different devices to be added to host computers without requiring modifications to generic system hardware or software.

When performing concurrent maintenance on peripheral devices connected to the SCSI bus while the bus remains in operation, the peripheral device may be inserted or removed from the SCSI bus while the system is running and the other devices are communicating over the bus. Such "hot-plugging" of an electrical device on the SCSI bus disrupts on-going transfer on the data bus by introducing electrical spikes and glitches that may cause data corruption. Further, power spikes and glitches on the power connector may cause failure of the power supply or an overcurrent fault. In order to avoid this possibility of data corruption or power supply interruption, some prior art systems turn power off to the device that is being hot-plugged. In some systems, which device is to be serviced is communicated to a power control network by a SCSI bus initiator over a special power control bus. The SCSI bus initiator then indicates to the power control object when to remove power and to restore power to the device being serviced. In other systems, special hot-plugging logic is included in the power control system of the device slots to allow a device to be pulled and inserted into the bus system while power remains on the rest of the electrical devices. What is clearly needed is a power control system for a SCSI bus that does not require an additional hardware path to support power communications or complicated and expensive hot-plugging circuitry, while still maintaining data integrity of the bus and power integrity of the power supply when electrical devices are removed and inserted on an active SCSI bus.

SUMMARY OF THE INVENTION

A method and apparatus that prevents data corruption and power supply failure caused by device connection transition on an active SCSI bus is provided. A bus initiator pauses communication on the SCSI bus such that only communication by the bus initiator is allowed over the data communication bus. All other communication between peripheral devices attached to the data communication bus is paused. A shutdown signal from the bus initiator is transmitted over the data communication bus to a power controller, which eliminates power to a device slot corresponding to the received shutdown signal. After a connection transition of an electrical device in the device slot, a power reset signal is transmitted from the bus initiator over the data communication bus to the power controller, which then restores power to the device slot upon receiving the reset power signal. The bus initiator then releases the data communication bus from being paused such that all communication on the data communication bus by peripheral devices is allowed. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
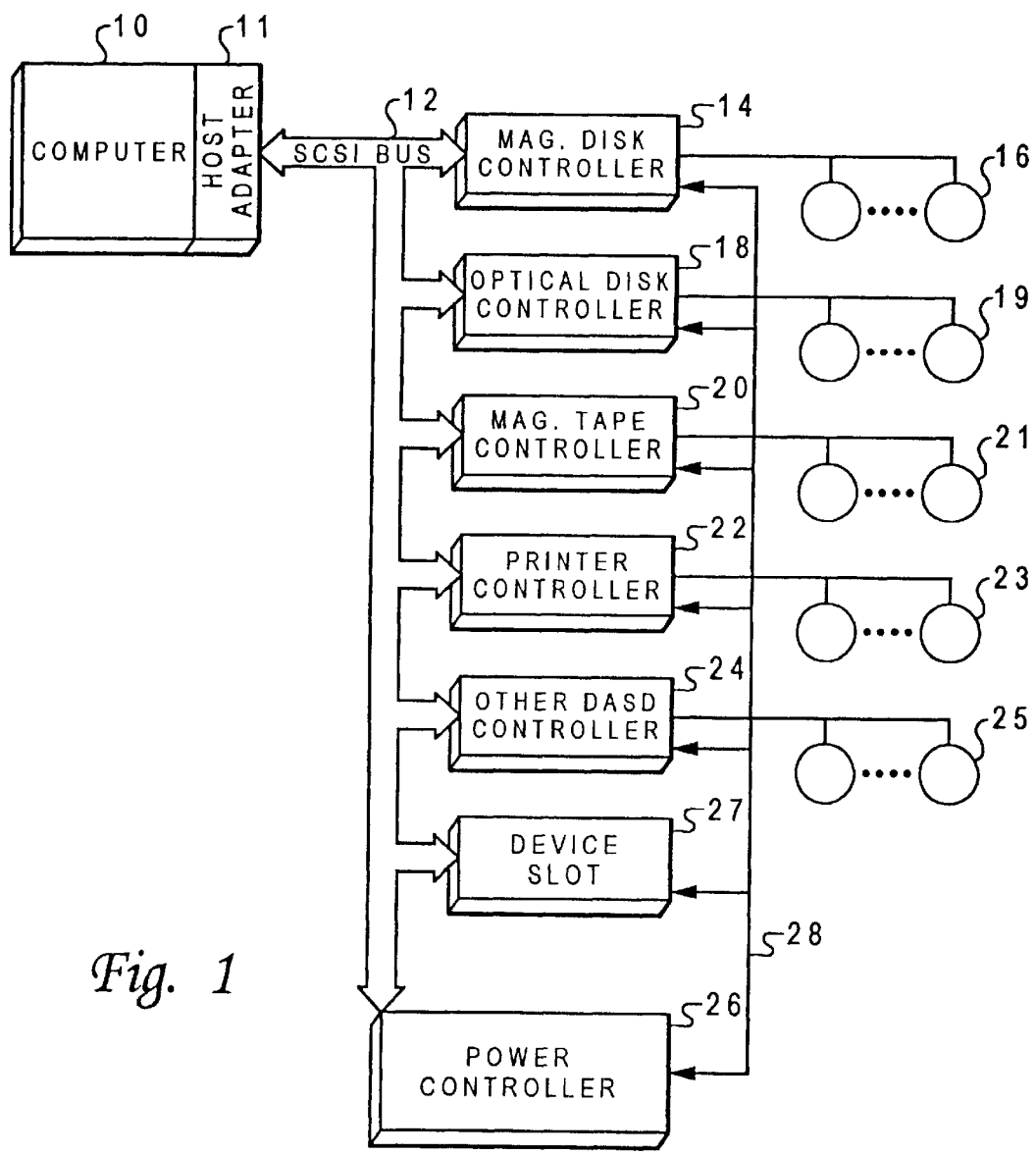
FIG. 1 shows in block diagram form the interconnection of several peripheral devices via a SCSI bus to a single computer, in accordance with a preferred embodiment of the present invention.

With reference now to the figures and in particular with reference to FIG. 1, there shown in block diagram form the interconnection of several peripheral devices via a SCSI bus to a single computer, in accordance with a preferred embodiment of the present invention. In particular, a computer 10 with host adapter 11 is shown to be interconnected with a SCSI bus designated 12. Also, coupled to bus 12 is a magnetic disk controller 14 and a plurality of magnetic disk devices generally designated as 16. In a similar manner, optical disk controller 18 and a plurality of optical disks 19 are shown coupled to the bus along with magnetic tape controller 20 and a plurality of magnetic tape drives 21, printer controller 22 and a plurality of printers 23, and other direct access storage device (DASD) controller 24 along with a plurality of DASD devices 25. FIG. 1 also shows a device slot 27 that has no electrical device mounted therein. Each of the controller devices may have one or more storage devices coupled to them. As will be appreciated, the controller devices are typically plugged into device slots of a module housing that provides a physical housing for the peripheral devices and conveniently mounts power, identification and communication connectors to facilitate rapid removal and insertion of devices into the SCSI network. Each electrical or peripheral device 14, 18, 20, 22 and 24 is mounted within a device slot similar to device slot 27 that provides an interface with the power lines required to power the devices and the SCSI connectors required to allow data transfer between the peripheral device and the SCSI bus. In general, based upon a requirement of computer 10 during its normal course of operation under control by an application program, information and requests transmit over bus 12 to the SCSI compatible devices via the appropriate controllers to either store or retrieve information from the storage devices. Power controller 26 is connected to each device slot 14, 18, 20, 22, 24, 27 via power control line 28. Power controller 26 can turn on or turn off power to each device slot in any electrical device plug therein by sending signals over power control line 28. Power controller 26 is also connected to SCSI bus 12.

Although described as information storage devices in the preferred embodiment, it should be understood that the term "electrical device" or "peripheral device" as used herein is used in a general sense and includes, for example, disk drives, controller means, switches, status indicators, circuit boards, cooling fans, power supplies, and the like, and that the present invention can be practiced with any type of electrical device known. The term "connection transition" as used herein means a transition in the state of the connection of a device on the communication bus. The term typically defines either the insertion, removal, insertion and removal, or replacement of an electrical device from a device slot. In the preferred embodiment, connection transitions occur while other electrical devices remain powered and continue to communicate over the communication bus.

Figure 2:
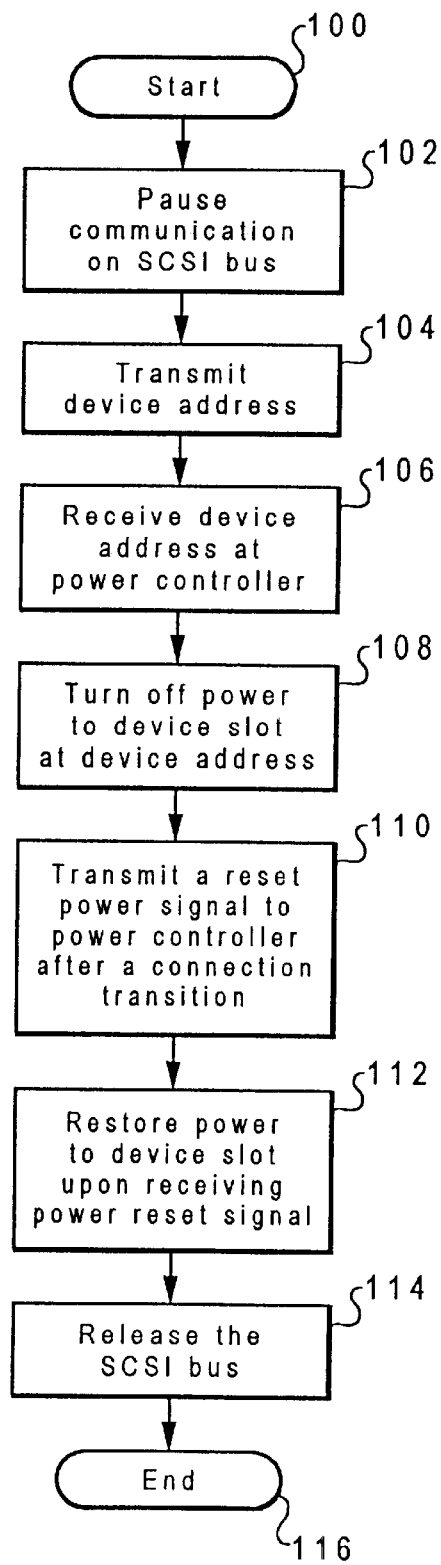
FIG. 2 shows a logic flow diagram of the method of device connection transition on an active data communication bus, according to a preferred embodiment of the present invention.

With reference now to FIG. 2, there shown a logic flow diagram of the method of device connection transition on an active data communication bus, according to a preferred embodiment of the present invention. The process starts at step 100 when concurrent maintenance on a SCSI device is to be performed on the active communication system. Examples of concurrent maintenance would be when the device is to removed from the network to perform maintenance or is being inserted into a device slot to plug the electrical device into the network. At step 102 a SCSI initiator (in this case in the host adapter) pauses the bus by driving self-selection ("self-selection" is defined herein as winning arbitration, then executing a selection phase where only the address of the initiator is driven) on the address lines of the SCSI bus to quiesce all other operations on the bus. This allows the host adapter to take control of the communication bus such that no other device can communicate over the bus. The bus initiator (i.e. SCSI controller) then drives the data lines with the device address for the device slot that will have a connection transition in a command that is only read by the power controller 26 (step 104). This device address is received by the SCSI bus power controller 26 (or power control logic) that controls power to the device slots (step 106). The power controller eliminates power to the device slot to allow an electrical device to be removed or inserted into the device slot (step 108). At this point, an indicator such as a LED is powered to tell the operator that the connection transition can safely occur. After the corrective maintenance that causes a connection transition is performed on the device in the device slot, the bus initiator transmits a reset power signal over the SCSI bus that is received by the power controller. (step 110). The reset power signal can be any selected device address that is not used by a device slot. For example, the bus initiator can drive the data lines to a logic zero. The power controller senses the data lines equal to logic zero and powers on the device slot, returning power to the electrical device plugged into the device slot and reinstituting a communication connection for the device on the communication bus. (step 112). The SCSI bus is then released by the bus initiator to allow communication over the SCSI bus among the other electrical devices still connected within the network (step 114). Thereafter, the process ends at step 116.

As will be appreciated, the method and apparatus of the present invention provides a mechanism whereby the required communication from the initiator to the power controller occurs over the SCSI bus to shut down power to a device slot while a connection transition occurs, without the need for any other external buses or connections between the two points or additional hardware interface and code to control the insertion or removal of electrical devices within the SCSI network. This will protect the power supply from power surges or spikes that may damage the supply or cause an overcurrent situation. As will further be appreciated, the present invention quiesces the SCSI bus while a connection transition occurs at a device slot so that if an electrical spike or glitch occurs on the bus, no active communication can be effected and the data integrity of the active network is not compromised. Thus, other peripheral devices in the SCSI network do not have to be powered down or their communication shut down to remove, insert or replace another peripheral device on the bus. Therefore, it can be seen that the present invention provides the advantages of substantially reducing the expense of providing additional hardware and software code to support shutting off power to a device slot when plugging an electrical device, and avoiding the data corruption possibility created by plugging the electrical device into an active SCSI network. While the invention has been particularly shown and described with reference to a preferred embodiment, it will be understood by those skilled in the art that various changes in form and detail may be made therein without departing from the spirit and scope of the invention.

What is claimed is:

1. A method of device connection transition on an active data communication bus, said method comprising the steps of:

pausing communication on the data communication bus such that only communication by a first electrical device is allowed over the data communication bus;

following said pausing of communication on said data communication bus, transmitting a shutdown signal over data lines within said data communication bus from said first electronic device to a third electronic device, said shutdown signal instructing said third electronic device to eliminate power to a device slot; and releasing the data communication bus from being paused such that all communication on the data communication bus by electrical devices is allowed after a connection transition of a second electrical device in said device slot.

2. A method according to claim 1, further comprising the steps of:

receiving the transmitted shutdown signal at a third electrical device;

eliminating power to a device slot corresponding to the received shutdown signal;

transmitting a power reset signal from the first electrical device over said data lines of the data communication bus after a connection transition of said second electrical device in the device slot;

receiving the transmitted power reset signal at the third electrical device; and restoring power to the device slot upon receiving the reset power signal, wherein the data communication bus is released after the power is restored.

3. A method according to claim 1, wherein said step of pausing communication on the data communication bus comprises the step of driving a self-selection signal generated by said first electrical device on data lines of the data communication bus.

4. A method according to claim 1, wherein communication on the data communication bus follows a SCSI standard.

5. A method according to claim 1, wherein the first electrical device is a bus initiator, and wherein said step of pausing communication on the data communication bus such that only communication by a first electrical device is allowed over the data communication bus comprises the step of pausing communication on the data communication bus such that only communication by said bus initiator is allowed over the data communication bus.

6. A method of device connection transition on an active data communication bus, said method comprising the steps of:

pausing communication on the data communication bus such that only communication by a first electrical device is allowed over the data communication bus;

transmitting a shutdown signal from the first electrical device over data lines of the data communication bus;

receiving the transmitted shutdown signal at a third electrical device;

eliminating power to a device slot corresponding to the received shutdown signal;

transmitting a power reset signal from the first electrical device over said data lines of the data communication bus after a connection transition of second electrical device in the device slot;

receiving the transmitted power reset signal at the third electrical device;

restoring power to the device slot upon receiving the reset power signal; and releasing the data communication bus from being paused such that all communication on the data communication bus by electrical devices is allowed.

7. A method according to claim 6, wherein said step of pausing communication on the data communication bus comprises the step of driving a self-selection signal generated by the first electrical device on data lines of the data communication bus.

8. A method according to claim 6, wherein said step of transmitting a power reset signal includes the step of driving data lines of the data communication bus to a reset state.

9. A method according to claim 6, wherein said step of transmitting a power reset signal includes the step of driving data lines of the data communication bus with a selected device address.

10. A method according to claim 6, wherein communication on the data communication bus follows a SCSI standard.

11. A method according to claim 6, wherein the first electrical device is a bus initiator, and wherein said step of pausing communication on the data communication bus such that only communication by a first electrical device is allowed over the data communication bus comprises the step of pausing communication on the data communication bus such that only communication by said bus initiator is allowed over the data communication bus.

12. A method according to claim 6, wherein said step of transmitting a shutdown signal includes the step of transmitting a device address of the device slot.

13. A bus network that provides communication and connection transition of electrical devices in the network, said bus network comprising:

a communication bus;

a plurality of device slots interconnected by the communication bus to provide data transfer between the communication bus and electrical devices connected in one or more of the plurality of device slots, wherein the plurality of device slots provide power to electrical devices connected therein;

a controller connected to the communication bus that takes control of the communication bus such that no other device can communicate over the bus when a connection transition is to occur in one of the plurality of device slots, said controller including means, responsive to the controller taking control of the communication bus, for signalling over the communication bus to indicate a particular device slot among said plurality of device slots within which the connection transition is to occur;

a power device connected to the communication bus that individually controls power at each device slot among the plurality of device slots and any electrical device connected therein, wherein, if the power device senses the signal indicating the particular device slot over the communication bus, the power device removes power from the particular device slot until the controller signals that power is to be restored to the particular device slot;

wherein the controller signals power is to be restored to the particular device slot and releases control of the communication bus after a connection transition occurs in the particular device slot.

14. A bus network according to claim 13, wherein the communication bus is a parallel bus.

15. A bus network according to claim 13, wherein the communication bus is a SCSI bus.

16. A bus network according to claim 13, wherein the controller signals to indicate the particular device slot by sending a device address for the indicated device.

17. A bus network according to claim 13, wherein the controller signals to indicate power is to be restored by sending a selected device address.

18. A bus network according to claim 13, wherein the connection transition is the removal of an electrical device connected in the particular device slot.

19. A bus network according to claim 13, wherein the connection transition is the insertion of an electrical device into the particular device slot.

20. A bus network according to claim 13, wherein the connection transition is the replacement of an electrical device connected in the particular device slot.

* * * * *